Patented Sept. 6, 1949

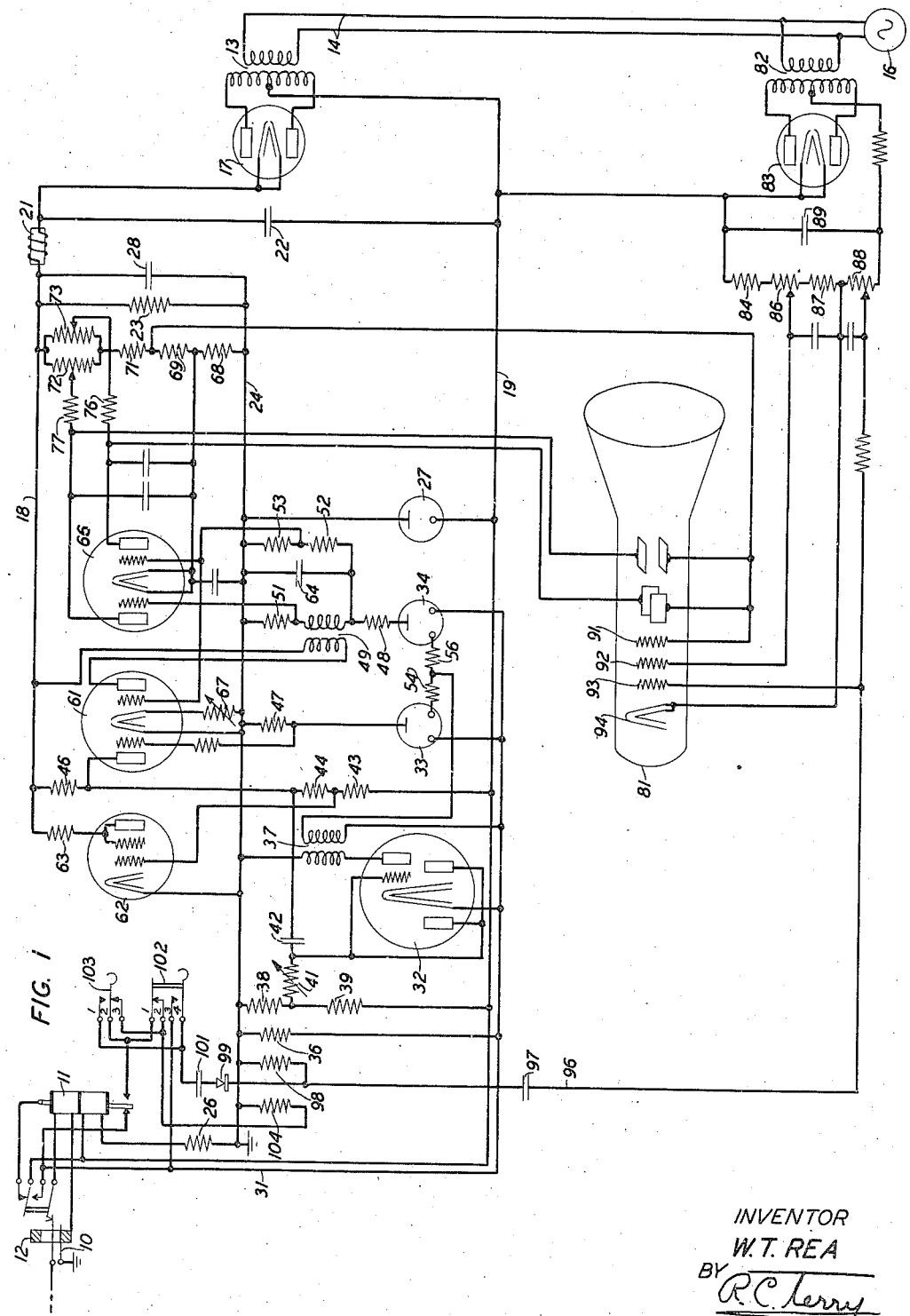

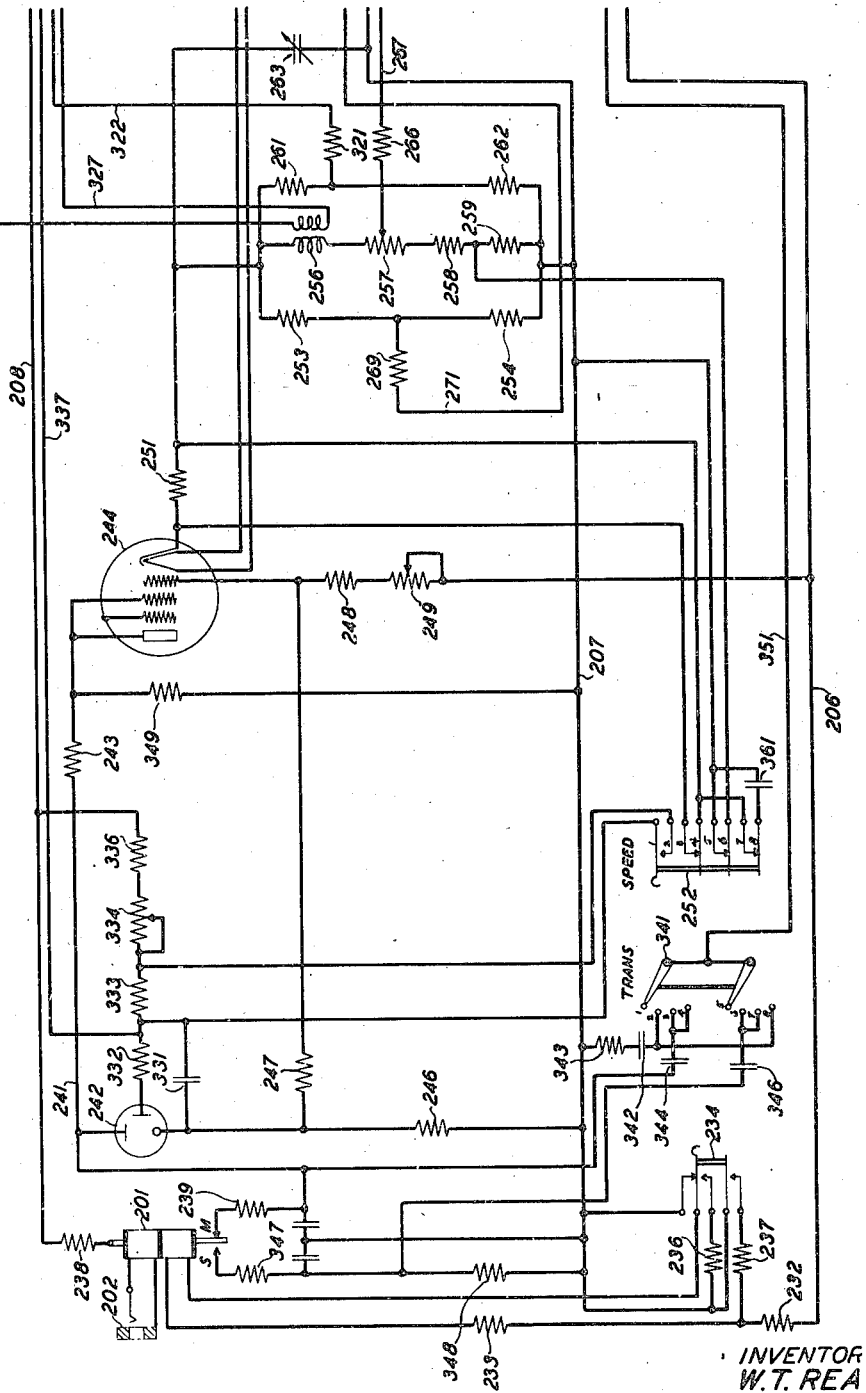

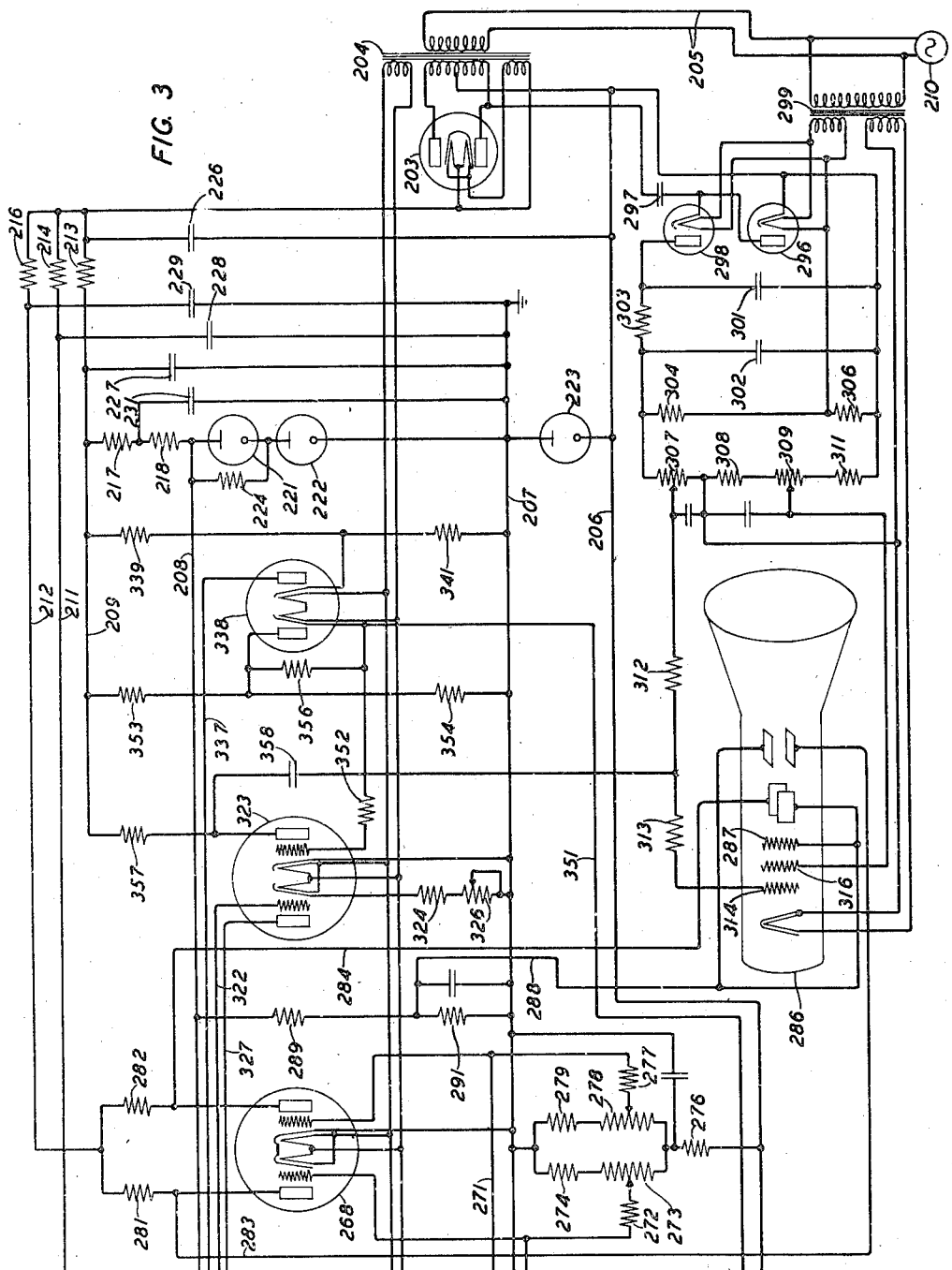

2,480,878

UNITED STATES PATENT OFFICE 2,480,878

TELEGRAPH SIGNAL DISTORTION MEASURING APPARATUS AND SYSTEM

Wilton T. Rea, Manhasset, N. Y., assignor to Bell Telephone Laboratories, Incorporated, New York, N. Y., a corporation of New York Application December 20, 1943, Serial No. 515,064

12 Claims. (Cl. 315—24)

This invention relates to telegraph system testing devices and particularly to the measurement of distortion of telegraph signals.

An object of the invention is to provide a telegraphic signal distortion measuring set in which with the exception of an electromagnetic signal responsive relay the measurement of signals is preformed by means wholly electronic.

Another object of the invention is to compensate for variations in space discharge currents in an electron tube system so that the full regulating capabilities of a voltage regulator instrumentality shall be available to compensate for voltage variations in a power supply source.

Another object of the invention is to sustain oscillation in an oscillatory circuit by feeding back into said circuit a voltage which is of opposite phase to the resistive voltage drop in the circuit.

The invention features an electron discharge tube system in which certain tubes have their space discharge paths in tandem or cascade relation to the space discharge paths of other of the tubes, thus establishing a point of intermediate potential relative to the uppermost and lowermost potential points of such cascade system. When in the course of operating the system in the intended manner the conductivity of a tube or tubes on one side of said intermediate potential point undergoes a substantial change or the conductivity of a plurality of tubes on both sides of said intermediate potential point undergoes substantial change in different degrees and in the same or opposite sense as a necessary step in the operation of the system, one tube especially provided to serve the sole purpose of a compenseator is caused to undergo a change in conductivity of such magnitude and sense as to compensate for all other changes in conductivity and to maintain substantially constant the flow of current through certain conductive elements of the tandem system.

The invention also features a voltage regulated power supply for an electron discharge tube in which regulation is achieved by employing electron discharge regulator tubes characterized by substantially constant space discharge voltage drops for a relatively wide range of space discharge current values and in which compensation for current variations in the electron discharge tube system operated from such power supply is effected independently of the electron discharge regulator tubes, leaving the full range of voltage regulation of such regulator tubes available for compeneating for voltage variations in the power source.

One embodiment of the invention contemplates a telegraph signal measuring system in which the signals to be measured are received by a polar relay having a biasing winding. Upon responding to the first impulse of a signal combination the relay causes a change to occur in the conductivity of certain electron discharge tubes and the result of the change in conductivity in these tubes is to set in operation an oscillatory circuit and an interval timing circuit. The interval timing circuit includes an electron discharge tube and this tube together with those which condition the timing circuit and start the oscilatory circuit are connected across a part of the output of a rectifying source of direct current. A voltage regulator tube and the biasing winding of the receiving relay are also connected across this part of the rectifying power supply. Signal measurment indications are obtained by employing a cathode-ray tube the electron beam of which is normally of insufficient intensity to produce a luminous spot on the screen of the tube and signal responsive transits of the armature of the receiving relay cause the intensity of the electron beam to be increased momentarily to a value above that of visibility. The sweep of the electron beam in the cathode-ray tube is controlled by an electron discharge tube which is connected across the other part of the power source of direct current. Also connected across this part of the power supply is a tube which serves the dual purpose of feeding energy into the oscillatory circuit to control the decrement thereof and controlling the timing circuit, and an electron discharge tube the sole purpose of which is to provide a current drain path in the output of the power supply.

Due to the divided nature of the output of the power supply the discharge path of the tubes connected across one part of the power supply are in tandem or series with the discharge paths of the tubes connected across the other part of the power supply. There are also certain fixed resistance paths across both parts of the power supply. In the idle condition of the apparatus the electron tubes in that part of the power supply with which the voltage regulator tube is associated draw current aggregating a predetermined amount and during a signal receiving cycle they draw no current. During the idle condition of the apparatus the tubes in the other part of the power supply, which control the sweep of the electron beam of the cathode-ray tube, feed back energy into the oscillator circuit and control the interval timing circuit, draw current aggregating a predetermined amount and during an operating cycle draw more current. If there were no tube in this part of the power supply for compensating for current changes in other electron tubes in the circuit, the voltage regulator tube would be subjected to a large increase in current upon the change from idle to running condition due to the decrease to zero of the discharge current in the tubes in parallel with it in one part of the power supply circuit and due to the increase in current through the tubes in the other part of the power supply. Thus the voltage regulating capabilities of the regulator tube would be devoted to accommodating changes in conductivity as between the idle and running conditions, greatly reducing the capability of the regulator tube to accommodate voltage changes in the alternating current source from which the rectifying power supply is operated. With the provision of the compensating electron discharge tube that tube may be adjusted so that in the idle condition it draws current equal to that drawn by the electron discharge tubes in the part of the power supply with which the regulator tube is associated, plus current in an amount equal to the increase in conductivity of the tubes in the part of the power supply with which the compensating tube is associated. When the change from idle to running condition occurs, current through the electron discharge tubes in the regulated portion of the power supply and through the compensating tube in the unregulated portion of the power supply is cut off. The other tubes in the unregulated portion of the power supply undergo a change in conductivity due to a functional change in their condition of operation which is equal to the difference between the current drawn by the compensating tube when it was operating and the current drawn by the discharge tubes in the regulated portion of the power supply when they were operating. In this way the voltage regulator tube is required to undergo no change in current as between the idle and operating conditions of the system and its full voltage regulating capabilities are at all times available to compensate for voltage variations in the alternating current source from which the rectifying power supply is operated.

In accordance with another embodiment of the invention, the signals to be measured are received by a receiving relay which has a biasing winding. As in the case of the previously described embodiment this is the only electromagnetic relay employed in the system, all other operations involved in operating the cathode-ray tube which indicates the characteristics of received signals being performed or controlled by electron discharge tubes. In this embodiment of the invention the biasing winding of the receiving relay and certain other resistive paths are connected across a part of the power supply and a voltage regulator tube is connected across this part of the power supply to stabilize the voltage applied to the biasing winding of the receiving relay and to the other resistive paths. None of the electron discharge tubes is contained in this part of the power supply but these tubes are connected across another part of the power supply the voltage of which is regulated by regulator tubes. These regulator tubes compensate for the net change in conductivity of the several electron discharge tubes as between the idle and the running conditions so that the current through the voltage regulator tube which stabilizes the biasing winding of the receiving relay remains substantially constant and the full voltage regulating capabilities of the relay stabilizing voltage regulator tube are available for compensating for variations in the source of alternating current from which the power supply is operated.

For a complete understanding of the invention reference may be had to the following detailed description to be interpreted in the light of the accompanying drawings wherein:

Fig. 1 is a schematic circuit diagram showing a telegraph signal measuring system in accordance with one embodiment of the invention; and Figs. 2 and 3 viewed together with Fig. 3 at the right of Fig. 2 show a schematic circuit diagram of a telegraph signal measuring system in accordance with another embodiment of the invention.

Referring to the drawings and particularly to Fig. 1, reference numeral 11 designates a telegraph signal receiving relay the operating winding of which is connected to the tip and sleeve terminals of jack 12. The jack is adapted to receive a plug 10 connected to a full metallic or ground return telegraph loop over which signals to be measured are transmitted. Relay 12 is a biased polar relay and has a biasing winding to which a biasing voltage must be supplied. For supplying operating voltages for the biasing winding of relay 12 and for all other purposes including operation of a plurality of electron discharge tubes, a step-up transformer 13 has its primary winding connected to mains 14 which carry alternating current from a generating source 16 and has the terminals of its secondary windings connected to the anodes of a full wave rectifier tube 17. The indirectly heated cathodes of tube 17 represent the positive side of the direct current output and the center tap of the secondary of transformer 13 represents the negative side of the output. From these two points, the positive and negative conductors or bus bars 18 and 19, respectively, extend, the former including filter inductance 21. A filter condenser 22 is connected between these conductors.

From the positive conductor 18, a voltage dropping resistor 23 is connected to a conductor or bus bar 24. The biasing winding of receiving relay 11 in series with resistor 26 is connected between conductor 24 and negative conductor 19. Thus a direct current path is established from positive conductor 18 through resistors 23 and 26 and the biasing winding of receiving relay 11 to negative conductor 19. Since conductor 24 is connected at the junction of resistors 23 and 26, it assumes an intermediate potential less positive than conductor 18 by the potential difference across resistor 23 and more positive than conductor 19 by the potential difference across resistor 26 and the biasing winding of relay 11.

A voltage regulator tube 27 has its anode connected to conductor 24 and its cathode connected to conductor 19 so that its discharge path is bridged between these conductors. The function of voltage regulator tube 27 is to maintain a constant potential difference between low and intermediate potential conductors 19 and 24 and thus across the biasing winding of receiving relay 11. The reason for this is that the voltage available at commercial power mains, represented by conductors 14, may vary considerably with varying load conditions, and in the absence of regulation of that portion of the output of rectifier tube 17 which supplies the biasing potential for relay 11, such potential may vary correspondingly and may upset the desired relation of received signal potential to biasing potential. The regulator tube 27 holds the potential difference constant although passing current of varying values as the output voltage of rectifier tube 17 varies.

High and intermediate potential conductors 18 and 24 are bridged by a filter condenser 28. Various conductive paths additional to those through resistor 23, regulator tube 27 and the biasing winding of relay 11 are provided, as required by the telegraph signal measuring system between conductors 18 and 24, between conductors 24 and 19, and between conductors 18 and 19 without connection to conductor 24, these paths including space discharge paths of electron discharge tubes, potential dividers, and discharge tube anode and cathode load resistors as will be developed hereinafter.

Jack 12 is provided with auxiliary contacts comprising a swinger spring, a normal contact and an off-normal contact. The swinger spring is connected to low potential conductor 19. The off-normal contact is connected to the armature of relay 11. The normal contact is connected to the marking contact of relay 11 and to a conductor 31 which extends to the cathode of vacuum electron discharge tube 32, and to the cathodes of cold cathode gas-filled electron discharge tubes 33 and 34. With no plug inserted into jack 12, conductor 31 is connected to low potential conductor 19 through the swinger spring and normal contact of jack 12. With a plug inserted into the jack and a marking condition applied to the operating winding of relay 11 to hold the armature on the marking contact, conductor 31 is connected to low potential conductor 19 through the marking contact and armature of relay 11, the off-normal contact and swinger spring of jack 12. A resistor 36 is connected between intermediate potential conductor 24 and conductor 31 and thereby is in parallel with voltage regulator tube 27 in either of the above-mentioned conditions of jack 12.

Electron discharge tube 32 is a multiple section tube comprising a triode and two diodes, the cathode being common to all three sections. The anode of the triode section is connected to intermediate potential conductor 24 through the left-hand winding of a transformer 37. A potential divider comprising resistors 38 and 39 is connected between intermediate and low potential conductor 24 and 19, respectively, and thus is in parallel with voltage regulator tube 27 so that the voltage drop across this potential divider is constant. The junction point of resistors 38 and 39 is connected through a variable resistor 41 to the control grid of the triode section of tube 32 and to the anodes of the two diode sections of this tube. The control grid of the triode section of the tube is also connected through a condenser 42 to a potential divider comprising resistors 43, 44 and 46 in series bridged between high potential conductor 18 and low potential conductor 19, the condenser being connected to the junction point of resistors 44 and 46. The anode of cold cathode gas-filled discharge tube 33 is connected to intermediate potential conductor 24, through resistor 47. The anode of cold cathode gas-filled discharge tube 34 is connected through resistor 48 and then in branching paths through the right-hand winding of a transformer 49 and resistor 54 as one path and through resistors 52 and 53 as the other path to the intermediate potential conductor 24. From this it will be apparent that with no plug in jack 12 or with a plug inserted in jack 12 and the operating winding of relay 11 responding to a marking condition, the potential between the intermediate and low potential conductors 24 and 19, respectively, as regulated by the regulator tube 27 will be applied across the space discharge path of the triode section of tube 32, and across the main gap of cold cathode gas-filled tubes 33 and 34.

From this point on in the description, the presence of a plug in jack 12 connected to a telegraph line over which signals are to be received will be assumed and initially the relay 11 will be assumed to be responding to a steady marking condition. Under these circumstances, cold cathode tubes 33 and 34 are conductive through their main gaps and current will be flowing in the triode section and both diode sections of tube 32 due to the fact that the diode anodes and the control grid of the triode are more positive than the cathode by the potential difference across resistor 39. The grid, being positive, draws current, and this current, together with the diode plate current, flows through variable resistor 41 and lowers the potential of the grid and diode anodes with respect to the junction of potential divider resistors 38 and 39, but as a steady state condition the grid is slightly positive with respect to the cathode, and anode current flows in the triode section through the left-hand winding of transformer 37. Since the current through the left-hand winding of transformer 37 has a steady value, no voltage is developed in the right-hand winding of the transformer, one terminal of which is connected to conductor 31 and the other terminal of which is connected to the control anode of gas-filled tube 33 through resistor 54 and to the control anode of gas-filled tube 34 through resistor 56.

The control grid of the left-hand triode section of a twin triode tube 61 is connected to the low potential end of resistor 47 and the cathode of tube 61 is connected to intermediate potential conductor 24. With tube 33 conductive as previously stated, the control grid of the left-hand triode section of tube 61 is negative with respect to the cathode so that anode current does not flow in this triode section. The anode of the left-hand triode section is connected to the junction of resistors 46 and 44 so that resistor 46 is the load resistor for the left-hand triode section. There being no anode current, the current flowing through resistor 46 is the same as the current flowing through the resistors 44 and 43 and the charge on condenser 42 is represented by a potential difference equal to the voltage drop across resistors 43 and 44 less the slight voltage difference between the grid and diode anodes of tube 32 and the cathode of that tube. The potential divided comprising resistors 43, 44 and 46 provides a further control potential by virtue of the connection of the junction of resistors 43 and 44 to the control grid of an electron discharge tube 62 which has its cathode connected to the intermediate potential conductor 24 and its anode connected to the high potential conductor 18 through resistor 63. Resistors 43, 44 and 46 are so proportioned that the potential difference across resistor 43 is substantially equal to the potential difference between conductors 19 and 24 so that the control grid of tube 62 is at substantially the same potential as its cathode and tube 63 draws anode current which flows through resistor 63. The value of resistor 46 is very low by comparison with resistors 43 and 44 being about one part in 300 of the total resistance of resistors 43 and 44. Resistor 44 has about twice the resistance of resistor 43.

Discharge current through the cold cathode tube 34 flows through the series circuit comprising the right-hand winding of transformer 49 and the resistor 51 in parallel with the series circuit comprising resistors 52 and 53. A condenser 64 is in parallel with these two paths and therefore is charged to the potential across them. The point of interconnection of resistors 52 and 53 is connected to the control grid of the right-hand triode section of tube 61 and also to the control grid of the right-hand triode section of a twin triode tube 66. The cathode of the right-hand triode section of tube 61 is connected to intermediate potential conductor 24 through a variable resistor 67. The resistance value of resistor 51 and the right-hand winding of transformer 49 is small as compared with resistor 48 so that the drop across resistor 51 and the right-hand winding of the transformer is low. Thus the drop across resistors 52 and 53 is low. Furthermore, the resistance of resistor 53 is small as compared with that of resistor 52, so that the junction of those resistors and the grid of the right-hand triode section of tube 61 is only slightly negative with respect to the cathode. The right-hand triode section of tube 61 is thus conductive. The anode of the right-hand triode section of tube 61 is connected to high potential conductor 18 through the left-hand winding of transformer 49 and a steady current flows through this winding. Since both windings of the transformer are conducting steady current, neither winding has any inductive effect on the other.

A potential divider bridged between intermediate potential conductor 24 and high potential conductor 18 comprises resistors 68, 69 and 71 in series with paralleled resistors 72 and 73. Both cathodes of the twin triode tube 66 are connected to the junction of resistors 68 and 69 so that the cathodes are more positive than intermediate potential conductor 24 by the potential difference across resistor 68. The junction of resistor 51 and the right-hand winding of transformer 49 is connected to the control grid of the left-hand triode section of tube 66. Since the grid of the right-hand triode section is connected to the junction of resistors 52 and 53 along with the grid of the right-hand section of tube 61, it is only slightly less positive than the potential of the intermediate potential conductor 24. The very large portion of the total discharge current of tube 34 flowing through resistor 51 causes the grid of the left-hand triode section of tube 66 to be considerably more negative with respect to the intermediate potential conductor 24 than the grid of the right-hand triode section. The potentials of the two grids with respect to the cathodes are such that an appreciable anode current flows in the right-hand triode section whereas the anode current in the left-hand triode section is very nearly cut off.

The anode of the right-hand triode section of tube 66 is connected through a resistor 76 to a contactor which is variable with respect to resistor 73, this resistor being in itself a potential divider. The anode of the left-hand triode section of tube 66 is connected through a resistor 77 to a contactor which is variable with respect to resistor 72 which is also a potential divider. The anode current which the control grid of the right-hand triode section of tube 66 permits to flow is sufficient to produce a potential difference across resistor 76 which is substantially equal to the potential difference across the resistor 71 plus the portion of resistor 73 up to the contactor of that resistor. The anode of the right-hand triode section of tube 66 is connected to one of the horizontal deflecting plates of a cathode-ray tube 81. The other horizontal deflecting plate is connected to the junction of resistors 71 and 69. It follows from the previously stated relation of equality between the potential difference across the resistor 76 and the potential difference from the point of engagement of contactor associated with resistor 73 to the junction of resistors 71 and 69 that the two horizontal deflecting plates of the cathode-ray tube are at substantially the same potential and there is little or no horizontal deflecting potential on the cathode-ray tube. The anode of the left-hand triode section of tube 66 is connected to the upper vertical deflecting plate of cathode-ray tube 81. The lower vertical deflecting plate is connected to the junction of resistors 69 and 71. Since there is little or no anode current in the left-hand triode section of tube 66 and therefore little or no potential difference across resistor 77, it follows that the potential of the anode of the left-hand triode section is more positive than the junction of resistors 69 and 71 by the potential difference from the contactor of resistor 72 through the lower section of that resistor plus the potential difference across resistor 71. Thus the upper vertical plate of cathode-ray tube 81 is positive with respect to the lower plate.

Power for operating the cathode-ray tube is supplied from alternating current main 14 through step-up transformer 82 and full wave rectifier tube 83, the output of which includes potential divider resistors 84, 86, 87 and 88 in series and shunted by filter condenser 89. The positive side of the output of rectifier tube 83 is connected to the low potential conductor 19 so that all of the potentials supplied by rectifier tube 83 are more negative than the lowest potential supplied by rectifier tube 17 over conductor 19. Thus the lower vertical deflecting plate, one of the horizontal deflecting plates and an accelerating electrode 91 which is connected to these plates are more positive than the focussing electrode 92, the intensity control electrode 93 and the cathode 94 of the cathode-ray tube. The intensity control electrode 93 has the lowest potential, being controlled by an adjustable contactor associated with resistor 88; the cathode 94 is at the next higher potential, being connected to the junction of resistors 87 and 88; and the focussing electrode is still more positive being connected to an adjustable contactor associated with resistor 86. The potential of the intensity control electrode 93 is such that the electron beam fails to reach the fluorescent screen of the tube and accordingly no spot of light is seen on the screen.

In order to adjust the electron beam to its proper initial position, the contactor associated with potential divider resistor 88 is moved along the resistor until the beam reaches the fluorescent screen with sufficient intensity to produce a luminous spot. Plug 10 should be removed from jack 12 to permit the armature of relay 11 to move to spacing and remain there. This sets up oscillatory current in the oscillatory circuit comprising the right-hand winding of transformer 49 and condenser 64. Variable resistor 67 is adjusted to maximum decrement to permit oscillatory current to die out. With no current flowing in the oscillatory circuit the grids of the two triode sections of tube 66 are at the same potential and substantially equal anode currents will flow. By adjusting the potential dividers 72 and 73 the potentials on the beam deflecting plates of cathode-ray tube 81 may vary to bring the beam to the center of the screen.

This adjustment having been made, plug 10, connected to a source of signals having no bias or distortion, is inserted into jack 12. If the source of signals has not yet been started, the armature of relay 11 will be restored to and remain on marking and since condenser 42 has had time to recharge during the adjustment of the cathode-ray tube beam, tubes 32, 33 and 34 will be refired. This restores the system to the steady state, producing a substantial change in the conductivity of the left-hand triode section of tube 66 and very little change in the conductivity of the right-hand triode section. The beam of cathode-ray tube accordingly becomes deflected vertically but not horizontally from the center of the screen.

With the apparatus restored to the steady state it is in condition to receive the unbiased and undistorted signals for the purpose of completing the preliminary adjustments. Since the initial condition of the various electron discharge tubes has been set forth in the description of the circuit connections of those tubes it is summarized at this point that the triode section and both diode sections of tube 32, the gas tubes 33 and 34, the vacuum tube 62, the right-hand triode section of vacuum tube 61, and the right-hand triode section of vacuum tube 66 are conductive, the left-hand triode section of vacuum tube 66 is only slightly conductive and the left-hand triode section of vacuum tube 61 is not conductive. It should also be noted that the gas tubes 33 and 34 are conductive only through their main gap. The cathodes of these tubes are connected to conductor 31 and the control anodes of the tubes are connected through resistors 54 and 56 and through the right-hand winding of transformer 37 to conductor 31. Since there is steady current in the left-hand winding of transformer 37 and no voltage is being developed in the right-hand winding, the control anodes of the tubes are at the same potential as the cathodes.

Relay 11 responds to the start impulse of a start-stop telegraph signal by moving its armature to the spacing contact. The disengagement of the armature from the marking contact opens the connection between low potential conductor 19 and conductor 31 thus opening the main discharge path of gas-filled tubes 33 and 34. These tubes therefore are extinguished. Also, the lower terminal of resistor 36 and the cathode of tube 32 becomes disconnected from low potential conductor 19. The flow of current through resistor 36 ceases and the potential of the cathode of tube 32 is raised to the potential of intermediate potential conductor 24. The potential of the cathode is thus made equal to that of the anode and is made more positive than the grid and diode anodes by the potential difference across resistor 38. Thus no current will flow from the cathode to any of the anodes in tube 32. As the triode current in tube 32 dies out in the left-hand winding of transformer 37 an impulse is impressed on the control anodes of gas tubes 33 and 34 through resistors 54 and 56, respectively. The polarity of this impulse is such as to reduce the potential of the control anodes with respect to the cathodes. Since the cathodes and control anodes in tubes of this type are usable interchangeably and a discharge in the control gap will be produced if a sufficient potential difference is impressed across the gap irrespective of polarity, a momentary firing of the control gap in the two tubes 33 and 34 may occur. However, the discharge will not transfer to the main gap because the cathodes are disconnected from the low potential conductor 19 as are also the control anodes.

The extinguishment of gas-filled tube 33 stops the flow of current through resistor 41 and raises the potential of the grid of the left-hand triode section of tube 61 to that of the cathode, rendering the left-hand triode section conductive. Anode current in the left-hand triode section of tube 61 flows through resistor 46, increasing the potential difference across resistor 46 and rendering the junction of resistors 46 and 44 and the junction of resistors 44 and 43 less positive with respect to the low potential conductor 19 than they previously were. Prior to the extinguishment of tubes 32, 33 and 34 and the activation of the left-hand triode of tube 61, condenser 42 has been charged to a potential represented by the difference between the potential of the grid and diode anodes of tube 32 and the potential of the left-hand anode of tube 61. Upon the substantial reduction in the potential of the anode of the left-hand triode section of tube 61 as the anode current flows through resistor 46 condenser 42 discharges through the anode-cathode discharge path of the left-hand triode section of tube 61, conductor 24 and resistors 38 and 41.

As a further result of the activation of the left-hand triode section of tube 61 and the increase in the potential difference across resistor 46 the junction of resistors 44 and 43 to which the grid of tube 62 is connected is made very much less positive than it previously was and the grid of tube 62 is made negative with respect to its cathode. This cuts off the flow of current in tube 62. The sole purpose of tube 62 is to balance and compensate for current changes in other portions of the circuit and its operation to accomplish this purpose will be described in detail hereinafter.

With the extinguishment of gas-filled tube 34 steady current ceases to flow through the right-hand winding of transformer 49 and resistor 51 and through resistors 52 and 53 in parallel therewith. The inductive energy stored in the right-hand winding of transformer 49 causes current to flow which charges condenser 64, which thereafter discharges through the inductance and thus the circuit oscillates. The voltage developed across resistor 53, starting at slightly negative value, breaks into oscillation by crossing zero and swinging positive to a maximum value that is equal in magnitude to the maximum voltage developed across resistance 51. It follows from this that the oscillatory voltages developed across resistors 53 and 51 are in quadrature and are equal in amplitude. These voltages appearing on the grids of tube 66 are amplified and are applied respectively to the horizontal and vertical deflecting plates of cathode-ray tube 81. The electron beam in the cathode-ray tube is thus caused to describe a path on the screen of the tube. The voltage developed across resistor 53 is also applied to the grid of the right-hand triode section of tube 61. This causes the plate current of this triode section to vary in accordance with the oscillation and since the left-hand winding of transformer 49 is included in the anode circuit of the right-hand triode section of tube 61 energy is fed back into the oscillatory circuit to replace the energy dissipated in resistors 51, 52 and 53. The gain of the feedback circuit may be varied by adjusting resistor 67 and thus the decrement of the oscillations may be controlled.

With the voltage relationships mentioned above, namely the voltage applied to the grid of the right-hand triodes of tubes 61 and 66 slightly negative with respect to conductor 24 and prepared to rise through zero to positive values, and the voltage applied to the grid of the left-hand triode of tube 66 at a negative maximum and prepared to rise, the quadrature relationship is at once apparent, the voltage on the grids of the right-hand triodes of tubes 61 and 66 leading that on the grid of the left-hand triode of tube 66 derived from resistor 51. Current in the right-hand triodes of tubes 61 and 66, varying in phase with the voltage applied to their grids, rises substantially to maximum in the first quarter cycle of the oscillator, falls substantially to initial value in the second quarter cycle, decreases substantially to minimum in the third quarter cycle and returns to initial value in the fourth quarter cycle. By comparison with these voltage and current relationships, the voltage on the grid of the left-hand triode of tube 66 rises to zero during the first quarter cycle, rises to positive maximum during the second quarter cycle, falls to zero during the third quarter cycle and returns to negative maximum during the fourth quarter cycle. It is to be remembered that this is the voltage derived from resistor 51.

The current in the right-hand triode of tube 61 flows through the primary winding of transformer 49 and induces voltage therein. Since it is well known that the current in an inductance lags behind the impressed voltage and induces a voltage which opposes the impressed voltage, it follows that the induced voltage lags behind the current, and this lag is substantially a quadrature relationship. Thus the induced voltage starts at a negative maximum, rises to zero in the first quarter cycle, rises to positive maximum in the second quarter cycle, returns to zero in the third quarter and to negative maximum in the fourth quarter. It is noted that this voltage induced in the primary of transformer is in phase with the voltage across resistor 51.

The voltage induced in the secondary as a result of the current in the primary is opposite to that induced in the primary, and therefore is opposite in phase to the voltage across the resistor 51. Thus there is fed back into the oscillatory circuit by induction a voltage opposing and substantially nullifying the resistive voltage drop across resistor 51, thereby replacing and compensating for the resistive losses in the oscillatory circuit, which are confined almost entirely to resistor 51, the resistance of the secondary of transformer 49 being low by comparison with resistor 51 and the resistive loss in the secondary therefore being negligible. This is accomplished without tuning the primary of the transformer 49 or effecting phase correction in any other way. The adjustable cathode resistor 67 permits the amplitude of the voltage fed back into the oscillatory circuit to be varied. If resistor 67 is so adjusted that the voltage just compensates for resistive losses, the circuit will oscillate at constant amplitude if the adjustment is such that the voltage fed back is less than that which compensates for resistive losses the oscillator operates decrementally.

The decrement should be adjusted until the path traced is a closed geometrical figure which will ultimately be adjusted to conform to a circle, or until it traces a spiral which will probably not be symmetrical with respect to both axes of the screen. The path, whether a closed geometrical figure or a spiral, may be made symmetrical with respective to the axes of the screen by first adjusting potential divider 72 until the beam has the desired maximum deflection in the vertical direction, which preferably brings the beam to a point near the edge of the screen for maximum vertical deflection, and then by adjusting the potential divider 73 until the deflection at the horizontal axis is equal to the deflection at the vertical axis, in the case of a circular sweep, or until symmetry with respect to the axes of the screen is achieved in the case of a spiral sweep.

Following these adjustments, the intensity of the electron beam is reduced by readjustment of potential divider 88, until the beam ceases to be visible on the screen of tube 81 except for dots produced by signal responsive transits of the armature of relay 11. In addition to being connected to potential divider 88, the intensity control electrode 93 of cathode-ray tube 81 is also connected by conductor 96 to one side of a condenser 97. The other side of the condenser is connected through resistor 98 to intermediate potential conductor 24 and to one terminal of a unilateral conducting device or half-wave rectifier 99. The other terminal of unilateral conducting device 99 is connected to one side of a condenser 101 the other side of which is connected to spring 4 of a key 102 and to spring 1 of a key 103. The spacing contact of relay 11 is connected to spring 2 of key 103 and spring 1 of key 102. Spring 3 of key 103 and spring 2 of key 102 are connected through resistor 104 to intermediate potential conductor 24. Spring 3 of key 102 is connected to conductor 31 to which the marking contact of relay 11 is also connected.

With keys 102 and 103 in the unoperated condition as shown, the upper end of the conductive path including condenser 101, unilateral conducting device 99 and condenser 97 has no circuit connection. Upon operation of key 102 the upper end of this path becomes connected through springs 3 and 4 of the key to conductor 31 and thus to the marking contact of relay 11. At springs 1 and 2 one of two parallel paths from the lower terminal of resistor 104 to the spacing contact is opened but the other path remains closed through springs 2 and 3 of key 103.

Assuming that the system has been adjusted for operation including the provision of the proper potential on the intensity control electrode of cathode ray tube 81 before relay 11 began to receive signals, upon movement of the armature of the relay out of engagement with the marking contact the conductive path from low potential conductor 19 through the armature and the marking contact of the relay to the upper side of condenser 101 is interrupted. This causes an impulse to be applied through condenser 101, unilateral conducting device 99 and condenser 97 to the intensity control anode 93 of cathode-ray tube 81. The impulse is positive and momentarily makes the intensity control electrode more positive than it previously was, causing the point of impingement of the electron beam on the fluorescent screen of the tube to become momentarily visible as a luminous spot. As the armature comes into engagement with the spacing contact a conductive path is completed from low potential conductor 19 through the armature and spacing contact of the relay, springs 2 and 3 of key 103 and resistor 104 to intermediate potential conductor 24, but the intensity control electrode of the cathode-ray tube is not affected, because it is connected through condenser 97, unilateral conducting device 99 and springs 3 and 4 of key 102 only to the marking contact.

In response to the first code impulse of marking nature following the start impulse the armature of relay 11 leaves the spacing contact and returns to the marking contact. As the armature comes into engagement with the marking contact a negative impulse is applied to the intensity control electrode of the cathode-ray tube. Since this current impulse flows through the unilateral conducting device in a reverse direction the device presents a high resistance to the passage of the impulse. The resulting slowness of charge of condenser 101 therefore causes the negative impulse to be of fairly low peak magnitude and of fairly long duration as applied to the intensity control electrode of the cathode-ray tube. Hence should the relay chatter, the positive impulse produced by the contact break involved in the chattering of the armature fails to cause a dot to be produced on the screen of the cathode-ray tube. In this manner parasitic spots due to ordinary relay chatter are prevented. Upon each transit of the armature away from the marking contact as a spacing impulse is received during the reception of the code combination a luminous spot will appear on the screen of the cathode ray tube.

When key 103 is operated and key 102 is left unoperated the spacing contact of relay 11 remains connected through resistor 104 to intermediate potential conductor 24 through springs 1 and 2 of key 102 and becomes connected through springs 1 and 2 of key 103 through the conductive path including conductors 101 and 97 and unilateral conducting device 99. Under these circumstances the intensity control electrode 93 of cathode-ray tube 81 is not influenced when the armature of relay 11 leaves its marking contact or returns to the marking contact. When the armature moves into engagement with the spacing contact it applies a long negative impulse of low amplitude to the intensity control electrode, which is the opposite of the polarity that will render the beam visible on the screen of tube 81. A positive impulse is applied to the intensity control electrode 93 each time the armature leaves the spacing contact. In this way the time of beginning of relay armature transits from spacing to marking is registered. When keys 102 and 103 are both operated the marking and spacing contacts are both connected to the upper side of condenser 101 and resistor 104 is disconnected from the spacing contact. Under these circumstances the cathode-ray in tube 81 produces a luminous spot each time the armature leaves the marking or the spacing contact and thus both kinds of armature transits from marking to spacing and from spacing to marking are registered.

With the electron beam of tube 81 being moved through a circle or spiral at the rate which is preferably one revolution per telegraph impulse interval all luminous spots produced by unbiased and undistorted signals will fall on a radial line extending vertically from the center of the screen of the cathode-ray tube. In the case of circular rotation of the beam such luminous spots will be superimposed and appear as a single spot. In the case of spiral rotation of the beam the spots will be aligned along the vertical radial line, those representing successively later impulses in a received telegraph signal being successively nearer the center of the fluorescent screen. If the frequency of the oscillatory circuit is not one cycle per telegraph signaling impulse interval, the dots will not appear on the vertical radius, but will fall on one side of that radius if the cycles are too long, and on the other side if the cycles are too short. Accordingly the final adjustment of the system is to set the frequency of the oscillatory circuit at such value that the luminous dots fall on the vertical radius of the screen. This is accomplished by varying the capacity of condenser 64.

Following this adjustment the system is in condition to measure telegraph signals and indicate bias or distortion thereof. If received signals are biased or distorted the dots will occur early or late with respect to the radius corresponding to zero distortion or bias and the displacement of any transition may be read directly in percentage of a unit pulse length by providing either directly on the fluorescent screen end of the tube or on a transparent plate adjacent to that end of the tube 100 equally spaced radial lines. For example, when received signals are affected by positive or negative bias, all space-to-mark transitions occur early or late respectively, whereas the mark-to-space transitions are not shifted relative to the start transitions; hence the mark-to-space transitions will cause dots to appear on the zero displacement radius and the space-to-mark transitions will cause dots to appear on the radius which corresponds to the bias of the received signals. If, for instance, the bias is 25 per cent, the space-to-mark dots will appear on a radius 90 degrees in either direction from the zero displacement radius depending upon whether the bias is positive or negative. In the case of distortion other than bias both space-to-mark and mark-to-space transitions will in general be displaced. The dots will therefore be more or less scattered. By observing the average displacement of the space-to-mark and mark-to-space transitions independently the bias component may be determined. The total distortion is determined by observing the maximum deviation of any dot from the zero displacement radius.

During the reception of the several impulses comprising a telegraph signal code combination condenser 42 is discharging. Its capacity is such that substantially the full interval occupied by the significant impulses of the code is required for the condenser to become discharged sufficiently to bring the grid of tube 32 to the cathode potential. If at the time the grid comes to this potential the stop impulse is being received, holding the armature of relay 11 on the marking contact, the cathode of tube 32 will be connected to the low potential conductor 19 through the marking contact and armature of the relay, and the triode and diode sections of the tube can become conductive. The tube cannot become conductive while the armature of relay 11 is off the marking contact because the cathode is not then at negative potential with respect to the anode. As the anode current in the triode section of tube 32 rises to its full value a voltage is induced in the right-hand winding of transformer 37 which is applied between the cathodes and the control anodes of the two gas-filled tubes 33 and 34. These tubes become conductive across their control gaps and the discharge immediately transfers to the main anodes. Tube 33 reestablishes a potential difference across resistor 47 thereby reducing the potential of the left-hand grid of tube 61 with respect to the cathode and cutting off anode current in this tube. This reduces the potential difference across the resistor 46 thereby raising the potential of the grid of tube 62 to the potential of the cathode of that tube and rendering the tube conductive.

Tube 34 upon again becoming conductive stops oscillation of the oscillatory circuit by providing again a steady flow of current through the right-hand winding of transformer 49 and resistor 51 and also through resistors 52 and 53. As a result of the stopping of oscillation and the restoration of steady potential to the grids of tube 66 and to the right-hand grid of tube 61, the initial potentials are restored to the beam-deflecting plates of cathode ray tube 81, thus arresting rotation of the beam and restoring it to initial position at a distance vertically from the center of the fluorescent screen. The value of resistance 48 is so chosen that the oscillator circuit attains steady state condition in a critically damped manner. This causes the cathode ray beam to return quickly to its initial position. Condenser 42, having raised the potential of the grid of tube 32 to cathode potential so that the tube has become conductive tends to cause the grid of the tube to become positive with respect to the cathode but current flowing in the diode circuit of the tube quickly charges the condenser and prevents the grid from going to a high positive value with respect to the cathode. In this way the circuit is restored to its initial steady state condition ready for reception of the start pulse of the next telegraph signal code combination.

As previously stated the vacuum electron discharge tube 62 which has its anode current path connected between high potential conductor 18 and intermediate potential conductor 24 is employed as a compensating or current balancing tube. Its activation and deactivation have no functional relation to the starting and stopping of the rotation of the electron beam in the cathode ray tube nor to the operation of the intensity control electrode 93 of the tube in accordance with received signals. The currents drawn from the output of rectifier 17 under the idle and under the signal receiving conditions are shown in columns I and II in the following table, in which the distribution of the currents in the principal paths between the high and intermediate potential conductors is shown in the upper part of the table and the distribution of currents in the principal paths between the intermediate and low potential conductors is shown in the lower part of the table:

|  | I | II |
|---|---|---|
|  | Mils | Mils |
| Resistor 23 | 20.00 | 22.10 |
| Resistors 68, 69, 71, 72 and 73 | 20.00 | 22.15 |
| Tube 66—Right triode | 0.40 | 0.275 |
| Tube 66—Left triode | 0.10 | 0.275 |
| Tube 61—Right triode | 10.00 | 11.10 |
| Tube 61—Left triode | 0.00 | 14.10 |
| Tube 62 | 45.50 | 0.00 |
| Totals | 96.00 | 70.00 |
| Voltage | 238 | 263.5 |

|  | I | II |
|---|---|---|
|  | Mils | Mils |
| Voltage regulator tube 27 | 17.50 | 17.50 |
| Tube 34 | 10.75 | 0.00 |
| Tube 33 | 5.25 | 0.00 |
| Tube 32 | 10.00 | 0.00 |
| Resistors 36 and 104 | 21.25 | 21.25 |
| Relay 11—Biasing winding | 31.25 | 31.25 |
| Totals | 96.00 | 70.00 |
| Voltage | 106 | 106 |

Only the principal paths have been included in the above table because all other paths are of such high resistance as to contribute negligible current. From the table it will be noted that the reduction in current due to the cutting off of tubes 32, 33 and 34 totals 26 milliamperes. At the same time, in the absence of tube 62 the activation of the left-hand triode of tube 61 would increase the current flowing between conductors 18 and 24. Since the voltage regulator tube fixes the voltage between conductors 24 and 19 and therefore fixes the current through resistive elements connected between those conductors, the current drawn by tubes 32, 33 and 34 prior to cutting off of those tubes plus the additional current between conductors 18 and 24 drawn by the left-hand triode of tube 61 could pass to the low potential conductor 19 only through regulator tube 27. The increase would be of the order of 40 milliamperes plus changes in current through resistive paths between conductors 18 and 24 due to the internal resistance of the rectifier circuit. Commonly available types of voltage regulator tubes are rated to carry not more than 30 milliamperes and must carry a minimum of 5 milliamperes for reliable voltage stabilization. Thus the voltage regulator tube could not accommodate current changes within the system supplied by the output of the rectifier tube 17 and would be deprived of all ability to stabilize the voltage between low and intermediate potential conductors 19 and 24 for varying voltages in the supply main 14.

With tube 62 included in the system this tube is arranged to absorb all current changes between the idle and operating conditions of the system, so that the current through the voltage regulator tube 27 will remain constant. Thus tube 62 carries the anode current, totaling 26 milliamperes, of tubes 32, 33 and 34, its anode circuit being in series with the anode circuits of these three tubes, and also carries the anode current which will subsequently be carried by the left-hand triode of tube 61, the anode circuit of which is in parallel with the anode circuit of tube 62. The value of this current is 14.1 milliamperes. In addition, the current through each other path between conductors 18 and 24 increases because, as indicated by the table, the drain on the output of rectifier tube 17 has been reduced by 26 milliamperes, and it is the characteristic of vacuum rectifier tubes that as the drain decreases the output voltage rises. In the present instance, as indicated by the table, the voltage changes from 238 volts to 263.5 volts, an increase of 25.5 volts. This voltage rise affects the current through resistors 23, 68, 69, 71, 72 and 73, both triode sections of tube 66, and the right-hand triode section of tube 61. The total current through these elements as derived from the chart is 50.5 milliamperes at the lower voltage. The factor of increase is the quotient of the voltage increase and the voltage before increase, 25.5/238 which, upon reduction to a decimal fraction, becomes .107. This factor of increase applied to the current value of 50.5 milliamperes yields a current increase of 5.4 milliamperes. The increase, added to the current of 14.1 milliamperes which the right-hand triode section of tube 61 carries after tube 62 is cut off, and to the current of 26 milliamperes by which the cutting off of tubes 32, 33 and 34 reduces the current drain, totals 45.5 milliamperes as indicated by the table. In this way tube 62 is made to carry all of the current drawn by tubes 32, 33 and 34, part of the current which resistors 36 and 101 and regulator tube 27 continue to carry after tubes 32, 33 and 34 are cut off and which transfers to the left-hand triode section of tube 61, and another part of the current which resistors 36 and 101 and regulator tube 27 continue to carry and which transfers to the right-hand triode of tube 61, both triodes of tube 66 and resistors 23, 68, 69, 71, 72 and 73. Regulator tube 27 is relieved by tube 62 of the burden of accommodating current changes resulting from functional variations in the conductivity of tubes 32, 33, 34, 61 and 66, and its current remains constant in spite of such changes. This leaves its full voltage regulation capability available to accommodate voltage variations in the supply mains 14, and its current may increase or diminish by 12.5 milliamperes before reaching its upper or lower limits in accommodating such variations, while holding constant the voltage between conductors 19 and 24, and therefore across the biasing winding of relay 11.

Figs. 2 and 3, when placed side by side with Fig. 3 at the right of Fig. 2, show a modified form of signal measuring apparatus in accordance with the present invention. The reference numeral 201 designates a receiving relay, the operating winding of which is connected to the terminals of jack 202 which is adapted to receive a plug connected to a telegraph circuit over which signals are to be received. The relay 201 has a biasing winding which receives its operating voltage from a power supply system including full wave rectifier tube 203 connected to the high voltage secondary winding of transformer 204, the primary winding of which is connected to power supply mains 205 over which alternating current flows from a source 210.

The negative terminal of the rectifier 203 has conductor 206 connected thereto which, following the terminology employed in the description of Fig. 1, may be considered as the low potential conductor. There is an intermediate potential conductor 207 and there are four high potential conductors 208, 209, 211 and 212. Conductors 209, 211 and 212 are connected to the positive terminal of the rectifier output through series resistors 213, 214 and 216, respectively. Thus the potential of these conductors will be less than that of the positive output terminal of the rectifier by the potential difference across their individual series resistors which, in turn, will be dependent upon the current drawn through these conductors. Two potential dropping resistors 217 and 218 are connected in series between conductors 208 and 209 so that the potential of conductor 208 will be less than that of conductor 209 by the potential difference across these resistors. Two voltage regulator tubes 221 and 222 are connected in series between conductors 208 and 207 and a voltage regulator tube 223 is connected between intermediate potential conductor 207 and low potential conductor 206. Voltage regulator tube 223 stabilizes at a fixed value the potential difference between conductors 206 and 207. Voltage regulator tubes 221 and 222 stabilize the potential difference between conductors 207 and 208 at a value which is twice that of the potential difference between conductors 206 and 207. Voltage regulator tube 221 is shunted by a resistor 224. Since the potential of conductors 207 and 208 is stabilized with respect to conductor 206, any variations in the output voltage of rectifier tube 203 will be distributed over resistors 218, 217 and 213 through which voltage regulator tubes 221, 222 and 223 draw current. A filter condenser 226 is connected between the positive and negative output terminals of rectifier tube 203. Filter condensers 227, 228 and 229 are connected between intermediate potential conductor 207 and high potential conductors 209, 211 and 212 respectively. A filter condenser 231 is connected between intermediate potential conductor 207 and the junction of resistors 217 and 218.

One terminal of the biasing winding of relay 201 is connected to low potential conductor 206 through resistors 232 and 233 and the other terminal is connected through normal contacts of a key 234 to intermediate potential conductor 207. Since the voltage between conductors 206 and 207 is stabilized by regulator tube 223, the biasing current in relay 201 will be stabilized. Key 234 is operable to connect an additional resistor 236 in series with the biasing winding of relay 201 and to place a resistor 237 in shunt with the series path comprising resistors 233 and 236 and the biasing winding of relay 201 for reducing the biasing current to permit the operating winding to operate the armature on a lower signaling current. Resistor 237 provides for a flow of current equal to the difference between the high and low biasing currents so as to maintain constant the flow of current between conductors 206 and 207 for either position of key 234 and also to maintain constant the impedance facing the biasing winding of the relay.

The armature of relay 201 is connected through resistor 238 to high potential conductor 208 and the marking contact of the relay is connected through resistor 239 and conductor 241 to the main anode of a cold cathode gas-filled electron discharge tube 242 and through resistor 243 to the anode of a vacuum electron discharge tube 244. The cathode of gas-filled tube 242 is connected through resistor 246 to intermediate potential conductor 207 and through resistor 247 to the control grid of tube 244. This grid is also connected through fixed resistor 248 and variable resistor 249 to low potential conductor 206. The cathode of tube 244 is connected through a resistor 251 which is shunted by contact springs 3 and 4 of key 252 and through three parallel paths to intermediate potential conductor 207. One of these paths includes resistors 253 and 254, another path includes the left-hand winding of transformer 256, potential divider resistance 257 and resistors 258 and 259, and the third path includes resistors 261 and 262. In parallel with this entire network is a variable condenser 263.

With the operating winding of relay 201 receiving a steady marking signal the armature is held on the marking contact and gas-filled tube 242 is conductive in a path from high potential conductor 208 through resistor 238, armature and marking contact of relay 201, resistor 239, space discharge path of tube 242 and resistor 246 to intermediate potential conductor 207. The cathode of tube 242 is more positive than intermediate potential conductor 207 by the potential difference across resistor 246 and the control grid of tube 244 is less positive than the cathode of tube 242 by the potential difference across resistor 247. Resistors 247, 248 and 249 are so proportioned that with tube 242 conductive the control grid of tube 244 will be slightly positive with respect to its cathode and plate current will flow in the tube 244. Since the cathode circuit of tube 244 includes three parallel conductive paths one of which includes the left-hand winding of transformer 256, current will flow in these paths. Resistor 259 in the path which includes the left-hand winding of transformer 256 is short-circuited by springs 5 and 6 of key 252 with the key in the position shown in Fig. 2 so that this resistance is, in effect, removed from the middle path. Condenser 263, being in parallel with the network, will be charged to a low steady potential because resistors 257 and 258 are of small resistance.

The contactor of potential divider 257 is connected through resistor 266 and conductor 267 to the control grid of the left-hand triode section of twin triode tube 268 (Fig. 3). The junction of resistors 253 and 254 is connected through resistor 269 and conductor 271 to the control grid of the right-hand triode section of tube 268. Biasing voltage for the grid of the left-hand triode section is obtained through a resistor 272 from the contactor of a potential divider 273 in a conductive path between intermediate potential conductor 207 and low potential conductor 206 including resistor 274, potential divider 273 and resistor 276 in series. Biasing voltage for the grid of the right-hand triode section of tube 268 is obtained through a resistor 277 from the contactor of the potential divider 278 contained in a conductive path between intermediate potential conductor 207 and low potential conductor 206 including resistor 279, potential divider 278 and resistor 276 in series.

The anodes of the left and right-hand triode sections of tube 268 are connected through resistors 281 and 282, respectively, to anode supply conductor 212. The common cathode of both triode sections of tube 268 is connected directly to intermediate potential conductor 207. The anodes of the left and right-hand triode sections of tube 268 are also connected over conductors 283 and 284, respectively, to one each of the vertical and horizontal deflecting plates, respectively, of a cathode ray tube 286. The other vertical and horizontal deflecting plates of tube 286 and also the beam accelerating electrode 287 of the tube are connected by conductor 288 to the junction of resistors 289 and 291 connected in series between the voltage regulated high and intermediate potential conductors 208 and 207, respectively. From this it will be apparent that one of the horizontal deflecting plates, one of the vertical deflecting plates and the acceleration electrode will be at a constant potential whereas the other vertical deflecting plate and horizontal deflecting plate will be at potentials depending upon the conductivity of the left and right-hand triode sections of tube 268.

Power for operating the cathode ray tube 286 is derived from one-half of the high voltage secondary winding of transformer 204 in a voltage doubler circuit. The center tape of the high voltage secondary of transformer 204 is connected to the cathode of a half-wave rectifier tube 296 and one of the terminals of the high voltage secondary winding is connected through a condenser 297 to the anode of half-wave rectifier tube 296 and to the cathode of a half-wave rectifier tube 297. The heater of rectifier tubes 296 and 297 is supplied from a separate low voltage secondary winding of a transformer 299, the primary of which is connected to power supply mains 205. Another low voltage secondary winding of transformer 299 supplies current for operating the heater of cathode ray tube 286. The output of the voltage doubler power supply is represented by the anode of tube 298 and the cathode of tube 296. Condenser input filtering is provided by the condensers 301 and 302, the former of which has one terminal connected to the cathode of tube 296 and the other terminal connected to the anode of tube 298, and the latter of which has one terminal connected to the cathode of tube 296 and the other terminal connected through a resistor 303 to the anode of tube 298. Resistors 304 and 306 are connected in series across the output of the filter and the junction of these resistors is connected to the heaters of the two tubes 296 and 298 to establish the heater at the proper potential relative to the cathodes of the rectifier tubes. Load resistors 307, 308, 309 and 311 are connected in series across the output of the filter. When the lower terminal of the high voltage secondary winding of transformer 204 is positive and the center tap is negative during a half cycle of alternating current impressed on the high voltage secondary winding of the transformer, current flows through the space discharge path of tube 296 to charge condenser 297. In the next half cycle of the alternating current the polarities on the high voltage secondary winding are reversed, the lower terminal being at negative potential and the center tap at positive potential. These polarities are in series-aiding relation to the charge on condenser 297 and current flows through condenser 297, the space discharge path of tube 298 and filter condensers 301 and 302, the condensers becoming charged to the voltage across one half of the high voltage secondary winding of transformer 204 plus the voltage across condenser 297. Thus the condensers 301 and 302 are charged once in each half cycle of the alternating current, the rectification is half wave, the output conductor which includes resistor 303 is the negative side of the output and the conductor connected to the cathode of tube 296 is the positive side of the output.

Load resistor 307 is a potential divider, its contactor being connected through resistors 312 and 313 to the intensity control electrode 314 of cathode ray tube 286. The cathode of the tube is connected to the junction of resistors 307 and 308. The junction of resistors 307 and 308 is more positive than the opposite end of resistor 307 so that the intensity control electrode 314 is negative with respect to the cathode when the contactor of potential divider 307 is moved away from the lower terminal of potential divider 307. Resistor 309 is a potential divider and its contactor is connected to the focussing electrode 316 of tube 286. The focussing electrode is therefore more positive than the cathode by the potential difference across resistor 308 plus the potential difference across the portion of potential divider 309 between the contactor and the junction of resistor 308 and potential divider 309. It will be noted that the conductor 206 previously referred to as the low potential conductor of the power supply served by rectifier tube 203, being connected to the mid-point tap of the high voltage secondary winding of transformer 204 to which the positive side of the output of the voltage doubler is connected, is at the same potential as the positive side of the power supply for cathode ray tube 286. In this way, the power supply for the cathode ray tube is placed in series-aiding relation with the power supply served by rectifier tube 203 at the extreme negative side of that power supply. Since the beam accelerating electrode 287 and one each of the horizontal and vertical deflecting plates of cathode ray tube 286 are connected to the junction of resistors 289 and 291 between intermediate and high potential conductors 207 and 208, respectively, of the output of rectifier tube 203, these electrodes of the cathode ray tube are more positive than the cathode by the potential difference across resistor 291 plus the potential difference across regulator tube 223 plus the potential difference across resistors 311, 309 and 308 in series.

As in the case of the previously described embodiment of the invention the normal operating condition of the cathode ray tube 286 is to have the intensity control electrode 314 sufficiently negative with respect to the cathode that the electron beam does not have sufficient intensity to produce a luminous spot on the screen of the cathode ray tube. In order to adjust the sweep of the beam to the desired configuration of a circle or a spiral, the intensity of the beam is increased by moving the contactor of potential divider 307 toward more positive voltages until a luminous spot is produced on the screen of the cathode ray tube. With no energizing potential applied to the operating winding of relay 201, the biasing winding moves the armature to its spacing contact and holds it there, thus interrupting the anode circuit of gas-filled tube 242 and vacuum tube 244. The cathode current through the network including the left-hand winding of transformer 256 is interrupted but this inductance and the resistors associated with it and condenser 263 in parallel with the network form an oscillatory circuit which begins to oscillate. Oscillatory voltages in quadrature are applied from the contactor of potential divider 257 through resistor 256 to the left-hand grid of tube 268 and from the junction of resistors 253 and 254 through resistor 269 to the right-hand grid of tube 268. The conductivity of the two triode sections of tube 268 is varied to apply sweep potentials to the deflecting plates of the cathode ray tube, but the desired pattern will not be produced until the beam has been adjusted for initial position and sweep path.

The junction of resistors 261 and 262 is connected through resistor 321 and conductor 322 to the grid of the left-hand triode section of a twin triode tube 323. The cathode of the left-hand triode section is connected through fixed resistor 324 and variable resistor 326 to intermediate potential conductor 207. The anode of the left-hand triode section is connected through conductor 327 and the right-hand winding of transformer 256 to anode supply conductor 211. The grid of the left-hand triode of tube 323 receives an oscillatory voltage and causes the anode current to oscillate correspondingly in the right-hand winding of transformer 256, which induces an oscillatory current in the left-hand winding of the transformer tending to sustain oscillations in the oscillatory circuit. The energy thus fed back into the oscillatory circuit replaces energy dissipated in the resistors. The gain of the feedback circuit may be varied by adjusting resistor 326. For purposes of preliminarily adjusting the electron beam in the cathode ray tube, resistor 326 should be adjusted for maximum decrement so that oscillatory current dies out in the oscillatory circuit.

With oscillatory current fully dissipated the grids of tube 268 are under the control of potential dividers 273 and 278. By adjusting these potential dividers the conductivity of the triode sections of tube 268 and hence the potential difference across the anode resistors 281 and 282 may be equalized, with the potential of the anodes substantially at the potential of the junction of resistors 289 and 291 so that the two vertical deflecting plates and the two horizontal deflecting plates of cathode ray tube 286 are brought to substantially the same potential and this will cause the electron beam to be directed to the center of the fluorescent screen of the tube.

As in the previously described embodiment of the invention the desired initial position of the beam is vertically displaced from the center of the screen. In order to effect this adjustment of the beam, it is necessary to restore conductivity to the tubes 242 and 244. Tube 242 cannot be restored to conductivity merely by restoration of the armature of relay 201 to its marking contact because it is necessary to apply an activating voltage between the control anode and the cathode of the tube in order to ionize the control gap and render it conductive. The mere restoration of the armature of the relay 201 to its marking contact will not reestablish conductivity in tube 244 with tube 242 remaining non-conductive because in the absence of a flow of cathode current from tube 242 in resistor 246, the grid of tube 244 is sufficiently negative to hold tube 244 cut off. It will be noted that a condenser 331 has one terminal connected to the cathode of tube 242 and the other terminal connected to the junction of resistors 332 and 333, the former of which has its other terminal connected to the control anode of tube 242 and the latter of which has its other terminal connected through variable resistor 334 and fixed resistor 336 to high potential conductor 208. The two terminals of resistor 333 are also connected to off-normal contact springs 1 and 2 of key 252. The junction of resistors 332 and 333 is also connected by conductor 337 to the anode of the right-hand diode section of twin diode tube 338. The cathode of the right-hand diode section is connected to the junction of resistors 339 and 341 connected in series between anode supply conductor 209 and intermediate potential conductor 207. Before the discharge current in tube 242 was cut off, the left-hand plate of condenser 331 was more positive than the intermediate potential conductor 207 by the potential difference across resistor 246. The right-hand plate of the condenser was more positive than the intermediate potential conductor 207 by the potential difference across resistor 341 plus the anode to cathode potential difference of the right-hand diode section of tube 338. At the instant that the armature of relay 201 left the marking contact and interrupted the discharge current through tube 242, current ceased to flow through resistor 246, bringing the left-hand plate of condenser 331 substantially to the potential of the intermediate potential conductor 207. Since both sides of the condenser have been at substantially the same potential there is substantially no charge on the condenser and the right-hand plate of condenser 331 is brought to a potential only slightly more positive than intermediate potential conductor 207. This makes the anode of the right-hand diode section of tube 338 negative with respect to the cathode and current ceases to flow through the diode. Thereafter condenser 331 charges slowly from high potential conductor 208 through resistors 336, 334 and 333 all of which are of relatively high value. Resistor 334 is variable to adjust the charging rate of condenser 331 so that the time required to charge condenser 331 to a sufficient potential to fire the control gap of tube 242 is substantially equal to the interval between the beginning of the start impulse and the beginning of the stop impulse of a start-stop telegraph signal combination. When the voltage across condenser 331 reaches the firing potential of the control gap of tube 242 it will fire the control gap. If the armature of relay 201 has returned to the marking contact, in response to the stop signal, the discharge will transfer to the main gap at once and will discharge condenser 331, quenching the control gap. If the armature of the relay has not returned to the marking contact, the control gap will remain conductive because the control anode has a positive potential applied through resistor 332. Upon the transfer of the discharge to the main gap, whether immediately or after a delay, tube 244 will again be rendered conductive and a steady current will flow through the network of resistors which includes the left-hand winding of transformer 256 and comprises the oscillator circuit.

With steady current flowing in the oscillator circuit the contactor associated with potential divider 257 may be adjusted to deflect the beam vertically from its axial position to the desired idle position. This adjustment is best made with sweep voltages applied to the deflecting plates of the cathode ray tube because the maximum vertical deflection should equal the maximum horizontal deflection to obtain a circular or uniform spiral trace. If the maximum vertical deflection of the beam is less than the maximum horizontal deflection, an ellipse or a flattened spiral will be traced having the major axis horizontal and if the maximum vertical deflection is greater than the maximum horizontal deflection an ellipse or a spiral having the major axis vertical will be traced. Since the resistor 269 has fixed connection to resistors 253 and 254, the maximum horizontal deflection cannot be varied and the maximum vertical deflection must be adjusted to match the horizontal deflection. Accordingly, start-stop telegraph signals should be applied to the operating winding of relay 201 and the variable resistor 326 which controls the amount of energy fed back into the oscillatory circuit from the right-hand winding of transformer 256 is preferably adjusted to obtain a closed geometrical figure which will probably be in the form of an ellipse. Following this, the contactor of potential divider 257 is adjusted until the path traced by the beam is a circle. Thereafter the decrement of the oscillatory circuit may be increased by adjusting variable resistor 326 to convert the path traced by the electron beam to a spiral having the successive convolutions sufficiently spaced that they are easily seen. Individual impulse beginnings or endings are not registered on the screen of the tube during this adjustment of sweep of the beam, because the intensity of the beam has been brought up to a level of continuous visibility. The telegraph signals merely cause the oscillator circuit to operate in start-stop manner, and thus the desired circular or spiral trace may be established.

After these adjustments have been made the contactor of potential divider 307 is moved toward less positive voltage until the potential on the intensity control electrode 314 of the cathode ray tube 286 has been made sufficiently negative with respect to the cathode to render the point of impingement of the beam on the screen invisible. The apparatus is now in condition for the timing of the oscillator, which necessitates the observation of the effect of received, undistorted telegraph signals.

For the purpose of observing the signal responsive transitions of the armature of relay 201 as luminous spots on the screen of the cathode ray tube, apparatus is provided for momentarily increasing the intensity of the beam in response to such armature transitions. This apparatus includes a switch 341 which has two contact arms connected together electrically and mechanically and two banks of contacts, one bank containing contacts 1, 2, 3 and 4 and the other bank containing contacts 5, 6, 7 and 8. Contacts 2 and 8 are connected through condenser 342 and resistor 343 to intermediate potential conductor 207. Contacts 3 and 4 are connected through condenser 344 to the junction of resistors 239 and 243. Contacts 6 and 7 are connected through condenser 346 to the junction of resistors 347 and 348 connected in series between the spacing contact and intermediate potential conductor 207. Resistors 239 and 347 have the same resistance value and resistor 348 has a resistance equal to that of resistor 243 plus a resistor 349 connected from the right-hand end of resistor 243 to intermediate potential conductor 207. The contact arms of switch 341 are connected over conductor 351 to the cathode of the left-hand diode section of tube 338 which is also connected through resistor 352 to the grid of the right-hand triode section of tube 323. The anode of the left-hand diode section is connected to the junction of resistors 353 and 354 connected in series between anode supply conductor 209 and intermediate potential conductor 207. A resistor 356 is connected between the anode and cathode of the left-hand diode section of tube 338. The cathode of the right-hand triode section of tube 323 is connected directly to the intermediate potential conductor 207. The anode is connected through resistor 357 to anode supply conductor 209 and is also connected through condenser 358 to the junction of resistors 312 and 313.

The switch 341 is provided to enable receiving armature transit indications for the mark-to-space transition alone or the space-to-mark transition alone or for both transitions. With the switch on the contacts 1 and 5, the conductive path to the cathode of the left-hand diode of tube 338 and to the grid of the right-hand triode of tube 323 is isolated from condensers 342, 344 and 346 and these tubes will not be influenced by armature transits. When the switch is on contacts 2 and 6, condensers 342 and 346 are connected to conductor 351 to influence the tubes 338 and 323 for armature transits from spacing to marking. When the switch contact arms engage contacts 3 and 7, condensers 344 and 346 are connected to influence the diode and triode for both spacing to marking and marking to spacing transits and when the contact arms are on contacts 4 and 8 condensers 342 and 344 are connected to influence the diode and triode for armature transits from marking to spacing. Assuming that the contact arms are on contacts 4 and 8 and with the armature held to the marking contact by a steady marking signal, condenser 342 will be charged to the voltage across resistor 354 supplied through resistor 356, which will have no voltage drop with the condenser fully charged, and through conductor 351 and contact 8 of switch 341. Since there is no potential across resistor 356 there will be no current through the left-hand diode section of tube 338. Condenser 342 will be positive on the side toward the left-hand cathode of tube 338 and negative on the side toward resistor 343. Condenser 344 will be charged to the difference between the voltage across condenser 342 and the voltage across the discharge gap of tube 242 and cathode resistor 246. Under the circumstance that tube 242 is not conductive, as during the reception of a code combination, the voltage across condenser 344 will be the difference between the voltage across condenser 342 and the voltage across resistors 243 and 349 in series. Under either condition the voltage across condenser 344 will be substantially the same and the potential is positive toward the marking contact and negative toward the left-hand cathode of tube 338. The voltage across condenser 344 is several times the voltage across condenser 342 because the positive side of condenser 344 is almost at the potential of conductor 208, resistors 238 and 239 being extremely small by comparison with resistors 243 and 349 or with resistor 246 and the resistance of the discharge path of tube 242, whereas the value of resistor 353 is several times that of resistor 354 and only a small voltage is developed across condenser 342.

In the steady state condition the grid of the right-hand triode section of tube 323 is positive with respect to the cathode by the potential difference across resistor 354. Current in the right-hand triode section of the tube is limited by anode resistor 357 and this resistor holds the anode only slightly positive with respect to the cathode. Resistor 352 has a very high resistance value and limits grid current to a very small value. The instant that the armature of relay 201 leaves the marking contact upon response of the relay to a spacing signal, such as the start impulse of a telegraph code combination, the voltage across condenser 344 is applied between the grid and cathode of the right-hand triode section of tube 323 with the negative polarity applied to the grid so that the grid is suddenly driven highly negative with respect to the cathode to cut off current through the tube and through resistor 357. The potential of the anode thus rises sharply and a positive impulse is applied through condenser 358 to change the potential of the intensity control electrode 314 of cathode ray tube 286 in the positive direction, rendering the point of impingement of the electron beam on the fluorescent screen visible. The left-hand diode section of tube 338 furnishes a relatively low resistance path for the discharge of condenser 344 and the condenser discharges very quickly through this path so that the grid of the right-hand triode section of tube 323 receives a negative voltage only momentarily, current in the right-hand triode section is cut off only momentarily and the intensity control electrode 314 of the cathode ray tube 286 is made less negative with respect to the cathode of the cathode ray tube only momentarily. Thus a luminous dot or short dash appears on the screen of the cathode ray tube, indicating the beginning of the transit of the armature of relay 201 from marking to spacing. Condenser 346 does not become charged when the armature reaches the spacing contact because the lower contact arm of switch 341 is at this time engaging contact 8 and the right-hand side of condenser 346 is connected only to contacts 6 and 7.

When the armature of relay 201 again returns to the marking contact condenser 344 is recharged, the charging current flowing in the opposite direction from that of the discharge current. The left-hand diode section of tube 338 will not pass current in this direction and accordingly the charging current must flow through resistor 356 which has a relatively high resistance value. Thus the charging time is longer than the discharge time. The charging current flowing through resistor 356 produces a potential difference across this resistor which is positive toward the cathode of the left-hand diode section of tube 338 and toward the grid of the right-hand triode section of tube 323 and negative toward the anode of the left-hand diode section of tube 338 and toward the cathode of the right-hand triode section of tube 323. Thus the grid of the triode section is made even more positive than it is in the steady state condition and tends to increase the anode current through the triode section. Such increase in current, if any occurs, causes a negative impulse to be applied through condenser 358 to the intensity control electrode 314 of tube 286 so that no luminous spot appears on the screen of the cathode ray tube as a result of re-engagement of the armature of relay 201 with the marking contact. Should the armature of relay 201 in returning to the marking contact bounce away from that contact momentarily, no false or parasitic luminous spot will appear on the screen of the cathode ray tube because as the armature leaves the contact only a small impulse is applied to the grid of the right-hand triode section of tube 323 since condenser 344 is only partially recharged, due to the high value of resistor 356 through the condenser recharges. Thus the right-hand triode section of tube 323 is rendered insensitive to relay chatter. Each time that relay 201 receives a spacing signal and the armature leaves the marking contact condenser 344 will discharge and a luminous spot will appear on the screen on the cathode ray tube. Each time the armature returns to the marking contact in response to reception of a marking signal condenser 344 will be recharged. Thus as telegraph signals are received only the armature transit from marking to spacing will be observed on the screen of the cathode ray tube.

With the contact arms of switch 341 engaging contacts 2 and 6 condensers 342 and 346 will be connected to conductor 351 and condenser 344 will be isolated. Under these circumstances condenser 346 will become charged when the armature of relay 201 comes into engagement with the spacing contact, will discharge and cause the production of a luminous spot on the screen of the cathode ray tube when the armature leaves the spacing contact in response to reception of a spacing signal and thus the armature transit from spacing to marking only will be registered. With the contact arms of switch 341 engaging contacts 3 and 7 condenser 342 will be isolated and condensers 344 and 346 will be connected to conductor 351. With the armature of relay 201 on the marking contact condenser 344 will be charged to the normal steady state potential which is relatively high and condenser 346 will be charged to substantially the same potential as that of condenser 342 when the contact arms of the switch engage contacts 4 and 8. Upon departure of the armature from the marking contact in response to a spacing signal condenser 344 will discharge and will produce a luminous spot on the screen of the cathode ray tube. Upon arrival of the armature at the spacing contact condenser 346 will become charged to the potential which condenser 344 had before the armature left the marking contact and condenser 344 will become charged to the potential which condenser 346 had before the departure of the armature from the marking contact. Upon reception of the next marking signal the armature will travel from the spacing to the marking contact. Upon the departure of the armature from the spacing contact condenser 346 will discharge and produce a luminous spot on the screen of the tube. Upon arrival of the armature at the marking contact condenser 344 will be recharged to its former steady state value and condenser 346 will be charged to its former steady state value which is the value corresponding to that of condenser 342 when the contact arms of switch 341 engaged contacts 4 and 8 and the armature of relay 201 was on the marking contact. Upon each transit of the armature from marking to spacing and from spacing to marking a luminous spot will appear on the screen of the cathode ray tube and thus the beginning of each transit in either direction will be indicated.

Condenser 342 and resistor 343 are provided for compensation purposes when the marking to spacing or spacing to marking transitions are being observed. It will be noted that when both transitions are being observed condensers 344 and 346 are both connected to conductor 351 and each is alternately charged to high and low voltage as the armature moves from one contact to the other. When marking to spacing or spacing to marking transitions only are being observed one or the other of the two condensers 344 and 346 is isolated from conductor 351 and the isolated condenser does not become charged. Thus without condenser 342 and resistor 343 there would be a slightly different distribution of potentials and a slightly different arrangement of charging and discharging paths when only one of the condensers 344 and 346 is connected to conductor 351 than when both are connected to this conductor. With condenser 342 and resistor 343 included in the circuit this condenser compensates for the omission of condenser 344 or 346 when only one type of armature transit is being observed.

Since it has been assumed that perfect or undistorted signals are being applied to the relay 201 for the purpose of adjusting the oscillator circuit to the proper frequency, the luminous dots representing either type of armature transit will not be aligned radially of the screen if the frequency is incorrect. If the frequency is too low, so that each cycle has a duration greater than an impulse interval of the signals, the luminous dots will be produced progressively later in successive convolutions of the beam. Conversely, if the frequency is too high, so that each cycle has a duration less than an impulse interval, and the luminous dots will be produced progressively earlier in successive convolutions of the beam. In either case the dots will not be aligned radially of the screen of the tube. By adjusting condenser 263, the frequency of the oscillator circuit may be varied until the dots are aligned radially of the screen of the tube. When they have been so aligned it will be known that the duration of each convolution of the beam, and therefore the duration of each cycle of the oscillator, is equal to the duration of each telegraph impulse.

When all of the foregoing adjustments have been made, the apparatus is in condition to measure distortion in received signals. As in the case of the previously described embodiment of the invention, when received signals are not affected by bias or fortuitous distortion, the luminous dots will be aligned substantially radially of the screen of the cathode ray tube, the dots appearing in successive convolutions of the spiral. Bias or distortion causes the dots to be displaced in one direction or the other from such radial line and if a transparent scale having one hundred equally spaced radial lines is disposed in front of the cathode ray tube screen the bias or distortion may be read directly in percentages of impulse lengths.

Key 252 is provided for changing certain of the circuit constants by specific amounts to change from one to the other of two operating speeds. As is well known there are several different standard operating speeds for telegraph circuits and systems. For example, some systems are arranged to operate at a speed of 360 characters per minute which corresponds to transmission of 60 words per minute. Others are arranged to operate at a speed of 450 characters per minute which represents transmission at 75 words per minute. It is desirable that the telegraph signal measuring apparatus according to the present invention be capable of being quickly changed from one speed to another in order that signals received over circuits operating at different speeds may be measured. When key 252 is in the condition shown in Fig. 2, the make contacts 1 and 2 are open and resistor 333 is included in the condenser charging circuit of condenser 331. Break contacts 3 and 4 are closed and a short-circuiting connection is established across resistor 251 in the cathode circuit of tube 244. Break contacts 5 and 6 are closed and a short-circuiting connection is placed across resistor 259 in the oscillatory circuit. Break contacts 7 and 8 are closed and a condenser 361 is connected in parallel with condenser 263. When key 252 is operated to the off-normal condition contacts 1 and 2 are closed, short-circuiting resistor 333 and thereby reducing the charging time for condenser 331 so that the firing potential for the control gap of tube 242 will be developed a shorter interval after the quenching of tube 242. It will be apparent from this that key 252 when operated to the off-normal condition provides for signal reception at the higher of two speeds. The opening of break contacts 7 and 8 disconnects condenser 361 from parallel relation to condenser 263, thus reducing the capacity of the oscillatory circuit. Since frequency is inversely proportional to the square root of the capacitance of a resonant circuit, the reduction of the capacitance in the circuit results in an increase in the frequency of oscillation. Accordingly, the electron beam of the cathode ray tube traces a spiral consisting of a number of convolutions each equal in duration to the length of the shorter signal element characteristic of the higher speed of signaling.

The disconnection of condenser 361 from parallel relation to condenser 263 increases not only the resonant frequency, but also the surge impedance of the oscillatory circuit. The addition of resistor 251 in series with the cathode circuit of tube 244 by removal of the short circuit when contacts 3 and 4 are opened increases the value of resistance used to return the oscillatory circuit to steady state in a critically damped manner proportionately to the increase in the surge impedance of the oscillatory circuit. In the lower speed condition the critically damped return to steady state is governed solely by the resistance presented by cathode-to-plate circuit of tube 244, whereas in the higher speed condition this resistance has added to it the value of resistor 251. The combined effect of the removal of condenser 361 and the insertion of resistor 251 is to maintain constant the peak voltage across the capacitance of the oscillatory circuit. Hence the oscillatory voltage applied to the grid of the right-hand triode of tube 268 has the same amplitude for both speeds of operation. Since, however, the insertion of resistor 251 decreases the steady state current flowing in the left-hand winding of transformer 256 and resistors 257 and 258, and since the peak of the oscillatory current which flows in resistors 257 and 258 is proportional to the steady state current which flows in the left-hand winding of transformer 256, resistor 259 must be inserted in series with resistors 257 and 258, by the opening of contacts 5 and 6, at the time the short circuit is removed from resistor 251 in order that the peak value of the oscillatory voltage applied to the grid of the left-hand triode of tube 268 be the same for both speed conditions. Since the circuit changes made by key 252 may not be exact in value it may be found desirable to recalibrate the sweep circuit for the cathode ray tube when a change is made from one to the other of the two speeds.

Although specific embodiments of the invention have been shown in the drawings and described in the foregoing specification it will be understood that the invention is not limited to such specific embodiment but is capable of modification and rearrangement without departing from the spirit of the invention and within the scope of the appended claims.

What is claimed is:

1. In a signal measuring apparatus, a signal responsive relay, a cathode ray tube having pairs of horizontal and vertical beam deflecting electrodes, a sweep circuit for said tube comprising an inductance normally having energy stored therein in the form of a steady magnetic field, a resistor in series with said inductance, a capacitance connected in parallel with said inductance and resistor, means controlled by said relay for releasing the energy stored in said inductance to cause current to flow in said inductance, resistor and capacitance in oscillatory manner, means for deriving a potential from said sweep circuit in phase with the current therein, means for applying said potential between the electrodes of one of said pairs, first and second means for deriving potentials from said sweep circuit in quadrature with the current therein, means controlled by said first quadrature potential deriving means for applying one of said potentials between the electrodes of the other pair, and means controlled by said second quadrature potential deriving means for generating in said inductance a potential in opposite phase relation to the potential developed across said resistor by said oscillatory current whereby to compensate for resistive energy loss in said sweep circuit.

2. In a signal measuring apparatus, a signal responsive relay, a cathode ray tube having pairs of horizontal and vertical deflecting electrodes and a beam intensity controlling electrode, means for impressing on said intensity controlling electrode a potential to cause the electron beam in said tube to be at subvisible intensity, a sweep circuit for said tube comprising an inductance normally having energy stored therein in the form of a steady magnetic field, a resistor in series with said inductance, a capacitance connected in parallel with said inductance and resistor, means controlled by said relay for releasing the energy stored in said inductance to cause current to flow in said inductance, resistor and condenser in oscillatory manner, means for deriving from said sweep circuit a potential in phase with the current therein, means for applying said potential between the electrodes of one of said pairs of deflecting electrodes, first and second means for deriving potentials from said sweep circuit in quadrature with the current therein, means controlled by said first quadrature potential deriving means for applying one of said potentials between the electrodes of the other pair, means controlled by said second quadrature potential deriving means for generating in said inductance a potential in opposite phase relation to the potential developed across said resistor by said oscillatory current whereby to compensate for resistive energy loss in said sweep circuit, and means responsive to signal responsive transits of said relay for momentarily altering the potential on said intensity controlling electrode to cause said electron beam to be rendered momentarily visible.

3. In combination with a cathode ray tube having pairs of horizontal and vertical beam deflecting electrodes, a sweep circuit for said tube comprising an inductance normally having energy stored therein in the form of a steady magnetic field, a resistor in series with said inductance, a capacitance connected in parallel with said inductance and resistor, means for releasing the energy stored in said inductance to cause current to flow in said inductance, resistor and capacitance in oscillatory manner, means for deriving a potential from said sweep circuit in phase with the current therein, means for applying said potential between the electrodes of one of said pairs of deflecting electrodes, first and second means for deriving potentials from said sweep circuit in quadrature with the current therein, means controlled by said first quadrature potential deriving means for applying one of said potentials between the electrodes of said other pair, and means controlled by said second quadrature potential deriving means for generating in said inductance a potential in opposite phase relation to the potential developed across said resistor by said oscillatory current.

4. In combination with a cathode ray tube having pairs of horizontal and vertical beam deflecting electrodes, a sweep circuit for said tube comprising an inductance normally having energy stored therein in the form of a steady magnetic field, a resistor in series with said inductance, a capacitance connected in parallel with said inductance and resistor, means for releasing the energy stored in said inductance to cause current to flow in said inductance, resistor and condenser in oscillatory manner, means for deriving a potential from said sweep circuit in phase with the current therein, means for applying in said potential between the electrodes of one of said pairs of deflecting electrodes, first and second means for deriving potentials from said sweep circuit in quadrature with said current, means controlled by said first quadrature potential deriving means for applying one of said potentials between the electrodes of said other pair, means controlled by said second quadrature potential deriving means for generating in said inductance a potential in opposite phase relation to the potential developed across said resistor by said oscillatory current, and means associated with said second quadrature potential deriving means for varying the amplitude of the potential generated in said inductance whereby to vary the decrement of oscillatory current.

5. In a critically damped oscillator circuit adapted to be started and stopped substantially without transients, an inductance, a resistor in series with said inductance, a capacitance in parallel with said inductance and resistor, an electron discharge tube controlled by the potential across said capacitance, an untuned inductance in the anode circuit of said tube and inductively coupled to the inductance in said oscillator circuit whereby to induce in the inductance in said oscillator circuit an oscillatory voltage in opposite phase relation to the voltage across said resistor without introducing starting and stopping transients in said oscillator circuit, and means associated with said electron discharge tube for changing the conductivity level of said tube whereby to vary the amplitude of anode current through said untuned inductance and correspondingly the amplitude of the voltage induced in the inductance in said oscillator circuit relative to the amplitude of the voltage across said resistor.

6. In an oscillator circuit, a capacitance, elements in series comprising an inductance and a resistor connected in parallel with said capacitance to provide a voltage take-off at the junction of said inductance and resistor in quadrature phase relation to the voltage across said capacitance, potential responsive means controlled by the potential across said capacitance, and means controlled by said potential responsive means for inducing in said oscillator circuit an oscillatory voltage in opposite phase relation to the voltage across said resistor.

7. In an oscillator circuit, a capacitance, elements in series comprising an inductance and a resistor connected in parallel with said capacitance to provide a voltage take-off at the junction of said inductance and resistor in quadrature phase relation to the voltage across said capacitance, a variably conductive device controlled by the potential across said capacitance, and an untuned inductance in the output circuit of said variably conductive device and inductively coupled to the inductance in said oscillator circuit whereby to induce in the inductance in said oscillator circuit an oscillatory voltage in opposite phase relation to the voltage across said resistor.

8. In a critically damped oscillator circuit adapted to be started and stopped substantially without transients, a capacitance, elements in series comprising an inductance and a resistor connected in parallel with said capacitance to provide a voltage take-off at the junction of said inductance and resistor in quadrature phase relation to the voltage across said capacitance, a variably conductive device controlled by the potential across said capacitance, and an untuned inductance included in the output circuit of said variably conductive device and inductively coupled to the inductance in said oscillator circuit whereby to induce in the inductance in said oscillator circuit an oscillatory voltage in opposite phase relation to the voltage across said resistor without introducing starting and stopping transients in said oscillator circuit.

9. In a critically damped oscillator circuit adapted to be started and stopped substantially without transients, a capacitance, elements in series comprising an inductance and a resistor connected in parallel with said capacitance to provide a voltage take-off at the junction of said inductance and resistor in quadrature phase relation to the voltage across said capacitance, an electron discharge tube controlled by the potential across said capacitance, and an untuned inductance included in the anode circuit of said tube and inductively coupled to the inductance in said oscillator circuit whereby to induce in the inductance in said oscillator circuit an oscillatory voltage in opposite phase relation to the voltage across said resistor without introducing starting and stopping transients in said oscillator circuit.

10. In an oscillator circuit, a capacitance, an inductance normally having energy stored therein and connected in series with a resistor across said capacitance to provide at the junction of said inductance and resistor a potential take-off in quadrature relation to the potential across said capacitance, means for releasing the energy stored in said inductance to cause current to flow in said inductance, resistor and capacitance in oscillatory manner, means for deriving a potential from said capacitance in quadrature relation to said current, and means controlled by said potential deriving means for transferring into said inductance a voltage in quadrature with said derived potential in the same angular direction whereby said transferred voltage opposes and counteracts the voltage developed across said resistor by said oscillatory current.

11. In an oscillator circuit, a capacitance, elements in series comprising an inductance and a resistor connected in parallel with said capacitance, a work circuit connected to have impressed thereon an oscillatory voltage from said capacitance and to be controlled thereby, and a second work circuit connected to the junction of said inductance and said resistor to derive from said junction an oscillatory voltage in quadrature phase relation to the first-mentioned voltage and to be controlled by said quadrature voltage.

12. A device for supplying oscillatory voltages in quadrature phase relation comprising a capacitance, an inductance and a resistor in series therewith connected in parallel with said capacitance to form an oscillatory circuit, voltage deriving means connected across said capacitance, and voltage deriving means connected across said resistor, said last-mentioned voltage deriving means receiving a voltage in quadrature phase relation to the voltage received by said first-mentioned voltage deriving means.

WILTON T. REA.

REFERENCES CITED

The following references are of record in the file of this patent:

UNITED STATES PATENTS

| Number | Name | Date |
|---|---|---|
| 2,153,179 | Fitch | Apr. 4, 1939 |
| 2,153,202 | Nichols | Apr. 4, 1939 |
| 2,183,918 | Mulder | Dec. 19, 1939 |
| 2,300,452 | Lewis | Nov. 3, 1942 |
| 2,307,237 | Rea | Jan. 5, 1943 |

OTHER REFERENCES

I. R. E., Sept. 1940, vol. 28, No. 9, pp. 406-409, Generation of Sync. Pulses by Impulse Excitation, by Sherman.